United States Patent [19]

Cok

[11] Patent Number: 4,630,307

[45] Date of Patent: Dec. 16, 1986

[54] SIGNAL PROCESSING METHOD AND APPARATUS FOR SAMPLED IMAGE SIGNALS

[75] Inventor: David R. Cok, Rochester, N.Y.

[73] Assignee: Eastman Kodak Company, Rochester, N.Y.

[21] Appl. No.: 649,001

[22] Filed: Sep. 10, 1984

[51] Int. Cl.$^4$ .............................................. G06K 9/46
[52] U.S. Cl. ..................................... 382/25; 340/728; 358/37; 358/138; 382/22; 382/27; 382/54
[58] Field of Search ....................... 382/22, 25, 27, 41, 382/54, 58, 16; 358/37, 137, 138, 280; 340/728

[56] References Cited

U.S. PATENT DOCUMENTS

| | | | |
|---|---|---|---|
| 4,032,977 | 6/1977 | Liao ..................................... | 358/280 |
| 4,068,266 | 1/1978 | Liao ..................................... | 358/280 |
| 4,163,214 | 7/1979 | Komori et al. ........................ | 382/56 |
| 4,163,257 | 7/1979 | White ................................... | 358/133 |
| 4,176,373 | 11/1979 | Dillon et al. .......................... | 358/37 |
| 4,275,418 | 6/1981 | Trump et al. ......................... | 358/167 |
| 4,356,555 | 10/1982 | Ejiri et al. ............................. | 382/54 |
| 4,360,883 | 11/1982 | Ejiri et al. ............................. | 382/54 |
| 4,528,693 | 7/1985 | Pearson et al. ....................... | 382/56 |

FOREIGN PATENT DOCUMENTS 0094750 11/1983 European Pat. Off. .

Primary Examiner—Leo H. Boudreau
Assistant Examiner—Joseph Mancuso
Attorney, Agent, or Firm—Thomas H. Close

[57] ABSTRACT

A signal processing method and apparatus for providing interpolated values between sampled values in a sampled image signal, is characterized by providing a plurality of different interpolation routines for producing interpolated signal values for appropriately completing a respective plurality of known features, detecting which of the geometrical image features is represented by a neighborhood of sample values and applying the interpolation routine appropriate for completing the detected feature, to produce the interpolated signal value. The signal processing method and apparatus has the advantage that reconstruction errors in the reproduced image are reduced. In one mode of the invention for processing images to be viewed by humans, reconstruction errors are forced to occur in areas of the image composed of natural textures where the errors are not readily visible to the human observer. The appearance of the reconstructed image is thereby improved.

2 Claims, 24 Drawing Figures

FIG. 1

| G | B | G | B | G |
|---|---|---|---|---|
| R | G | R | G | R |
| G | B | G | B | G |
| R | G | R | G | R |
| G | B | G | B | G |

FIG. 2A

| 100 | 100 | 100 | 0 | 0 |
|---|---|---|---|---|
| 100 | 100 | 100 | 0 | 0 |
| 100 | 100 | 100 | 0 | 0 |
| 100 | 100 | 100 | 0 | 0 |
| 100 | 100 | 100 | 0 | 0 |

FIG. 2B

| 100 |  | 100 |  | 0 |
|---|---|---|---|---|
|  | 100 |  | 0 |  |
| 100 |  | 100 |  | 0 |
|  | 100 |  | 0 |  |
| 100 |  | 100 |  | 0 |

FIG. 2C

| 100 | 100 | 100 | 25 | 0 |
|---|---|---|---|---|
| 100 | 100 | 75 | 0 | 0 |
| 100 | 100 | 100 | 25 | 0 |
| 100 | 100 | 75 | 0 | 0 |
| 100 | 100 | 100 | 25 | 0 |

FIG. 3A

| 0 | 0 | 100 | 0 | 0 |
|---|---|---|---|---|
| 0 | 0 | 100 | 0 | 0 |
| 0 | 0 | 100 | 0 | 0 |
| 0 | 0 | 100 | 0 | 0 |
| 0 | 0 | 100 | 0 | 0 |

FIG. 3B

| 0 |  | 100 |  | 0 |
|---|---|---|---|---|
|  | 0 |  | 0 |  |
| 0 |  | 100 |  | 0 |
|  | 0 |  | 0 |  |
| 0 |  | 100 |  | 0 |

FIG. 3C

| 0 | 25 | 100 | 25 | 0 |
|---|---|---|---|---|
| 0 | 0 | 50 | 0 | 0 |
| 0 | 25 | 100 | 25 | 0 |
| 0 | 0 | 50 | 0 | 0 |
| 0 | 25 | 100 | 25 | 0 |

FIG. 4

| 100 | 100 | 100 | 0 | 0 |
|---|---|---|---|---|
| 100 | 100 | 100 | 0 | 0 |
| 100 | 100 | 100 | 0 | 0 |
| 100 | 100 | 100 | 0 | 0 |
| 100 | 100 | 100 | 0 | 0 |

FIG. 5

| 0 | 0 | 100 | 0 | 0 |
|---|---|---|---|---|
| 0 | 0 | 50 | 0 | 0 |
| 0 | 0 | 100 | 0 | 0 |
| 0 | 0 | 50 | 0 | 0 |
| 0 | 0 | 100 | 0 | 0 |

FIG. 6A

|  | H |  |
|---|---|---|
| H | X | L |
|  | H |  |

FIG. 6B

|  | L |  |
|---|---|---|
| L | X | H |
|  | L |  |

FIG. 6C

|  | H |  |
|---|---|---|
| L | X | L |
|  | H |  |

FIG. 6D

|  | H |  |
|---|---|---|
| L | X | H |
|  | L |  |

SIGNAL PROCESSING METHOD AND APPARATUS FOR SAMPLED IMAGE SIGNALS

TECHNICAL FIELD

The invention relates to a signal processing method and apparatus for providing interpolated values between the sample values in a sampled image signal.

BACKGROUND ART

In a single-chip color image sensor, image sensing elements for luminance information (e.g. green or white) are spatially separated by image sensing elements for chrominance information (e.g. red and blue or cyan and yellow), leaving gaps between the luminance samples in the luminance signal produced by the image sensor. These gaps are usually filled in by some signal processing method involving interpolation.

U.S. Pat. No. 4,176,373 issued Nov. 27, 1979 to P. L. P. Dillon, shows a method for processing sampled image signals produced by an image sensor having a checkerboard luminance sampling pattern. The method involves linear interpolation (equivalent to finding the mean of the neighboring samples). The patent discloses linear interpolation along a horizontal line, and mentions that the method could be carried out in two dimensions by using samples from neighboring lines.

FIG. 1 shows a color sampling pattern for a single-chip color image sensor. The luminance sampling elements, labeled G, are separated by chrominance sampling elements, labeled R and B. FIG. 2a represents an image of a sharp vertical line. The elements labeled 100 represent high brightness and the elements labeled 0 represent low brightness. FIG. 2b represents the sampled values obtained from sampling the image of FIG. 2a with the luminance sampling pattern of FIG. 1. When linear interpolation is applied to the values shown in FIG. 2b, using the values of the four nearest neighbors (i.e. top, bottom, right and left) surrounding each interpolation location, the pattern illustrated in FIG. 2c is obtained.

As seen in FIG. 2c, the originally sharp vertical edge has been modulated with a pattern corresponding to the luminance sampling pattern. Similarly, when a thin stripe, such as the vertical stripe shown in FIG. 3a is sampled (the resulting samples are shown in FIG. 3b), and reconstructed using linear interpolation between the four nearest neighbors, the stripe is modulated with a pattern corresponding to the luminance sampling pattern as shown in FIG. 3c.

In an image intended for human viewing, these reconstruction errors are most objectionable in geometrical details such as edges, lines and corners. In an image intended for machine interpretation, such as a robot vision system used in a factory, the reconstruction errors are most objectionable when they interfere with the efficient operation of the system. For example, when the reconstruction error results in ambiguity as to the identification of a part of an assembly line.

Of course, the reconstruction errors may be reduced by increasing the number of image sensing elements in the image sensor but this increases the cost and complexity of the image sensor.

There is a need therefore for a signal processing method and apparatus for providing interpolated values between the signal values in a sampled image signal, that reduces the reconstruction errors in an image reconstructed from the processed image signal.

DISCLOSURE OF THE INVENTION

It is the object of the present invention to provide a signal processing method and apparatus for interpolating signal values between sampled values in a sampled image signal, whereby the reconstruction errors in an image reproduced from the processed image signals are reduced.

Basically the object of the invention is achieved by employing an interpolation method that uses prior knowledge about features existing in the images being reconstructed. A plurality of different interpolation routines are provided for completing the respective features. Local neighborhoods of image samples around an interpolation location are examined and the particular feature existing in the neighborhood is detected, then the interpolation routine appropriate for the detected feature is applied. By using the prior knowledge about the features existing in the image, the reconstruction errors in the image reproduced from the processed image signal are reduced.

When the signal processing method is applied to image signals intended for human viewing, geometrical features such as edges, lines and corners are assumed to exist in the image, and the interpolation routines are fashioned accordingly. The reconstruction errors remaining in the reproduced image occur mainly in natural objects having more irregular features, such as foilage, where the reconstruction errors are hardly noticeable to a human observer. As a result, the appearance of the reconstructed image is significantly improved.

The signal processing method is characterized by: (1) providing a plurality of different interpolation routines for producing interpolated signal values appropriate for completing a respective plurality of known geometrical image features; (2) detecting which of the known geometrical image features is represented by a neighborhood of sample values; and (3) applying the interpolation routine appropriate for completing the detected feature to the neighboring sample values to produce the interpolated signal value.

In a preferred embodiment of the invention, for processing a sampled image signal from an image sensor having a checkerboard-type sampling pattern, for producing images intended for human viewing, the image features are detected in a four-sample local neighborhood. The features include an edge, a stripe, and a corner. For the edge feature, the interpolation routine comprises producing the median value of the four surrounding sample values, where the median is defined as a value halfway between the two middle sample values. For the stripe feature, the interpolation routine is a function of the twelve nearest neighbors defined as $$X = \text{CLIP}_C^B (M-(S-M))$$

where:
X is the interpolated value,
$A \geq B \geq C \geq D$ are the values of the four nearest neighboring samples in rank order,
M is the median value of the four nearest neighboring samples,
S is the mean value of the eight next nearest neighboring samples, and $$\text{CLIP}_k{}^j(i) = \begin{array}{l} j \text{ if } j \leq i \\ i \text{ if } k \leq i \leq j \\ k \text{ if } i \leq k \end{array}$$

The interpolation routine for the corner detail is a similar clipping function defined as $$X = \text{CLIP}_C{}^B (M-(S'-M))$$

where: S' is the mean value of the four next nearest neighboring samples that straddle the boundary between the light and dark members of the four nearest neighboring samples.

BRIEF DESCRIPTION OF THE DRAWINGS

Modes of carrying out the invention are described with respect to the drawings wherein:

FIG. 1 is a schematic diagram of a single-chip color image sensor having a checkerboard luminance sampling pattern;

FIG. 2a is an idealized diagram showing the luminance values in a portion of an image having a sharp vertical edge;

FIG. 2b shows the sampled luminance values obtained by sampling the idealized image shown in FIG. 2a with the luminance sampling pattern of FIG. 1;

FIG. 2c shows the luminance values obtained by interpolating the values between sampled luminance values in FIG. 2b with two-dimensional linear interpolation;

FIG. 3a is an idealized diagram showing the luminance values of a narrow vertical line;

FIG. 3b shows the sampled luminance values obtained by sampling the image of FIG. 3a with the luminance sampling pattern of FIG. 1;

FIG. 3c shows the luminance values obtained by interpolating the values between sampled luminance values in FIG. 3b with two-dimensional linear interpolation;

FIG. 4 shows the luminance values obtained by interpolating the values between the sampled luminance values of FIG. 2a using the median of neighboring sampled values;

FIG. 5 shows the luminance values obtained by interpolating the values between sampled luminance values in FIG. 3b using the median of neighboring sampled values;

FIGS. 6a-6b show the geometrical feature classified as an edge in an embodiment of the signal processing method according to the invention;

FIG. 6c shows the geometrical feature classified as a stripe in an embodiment of the signal processing method according to the invention;

FIG. 6d shows the geometrical feature classified as a corner in an embodiment of the signal processing method according to the present invention;

MODES OF CARRYING OUT THE INVENTION

Figures 7A, 7B, 8A, 8B, 8C, 9:
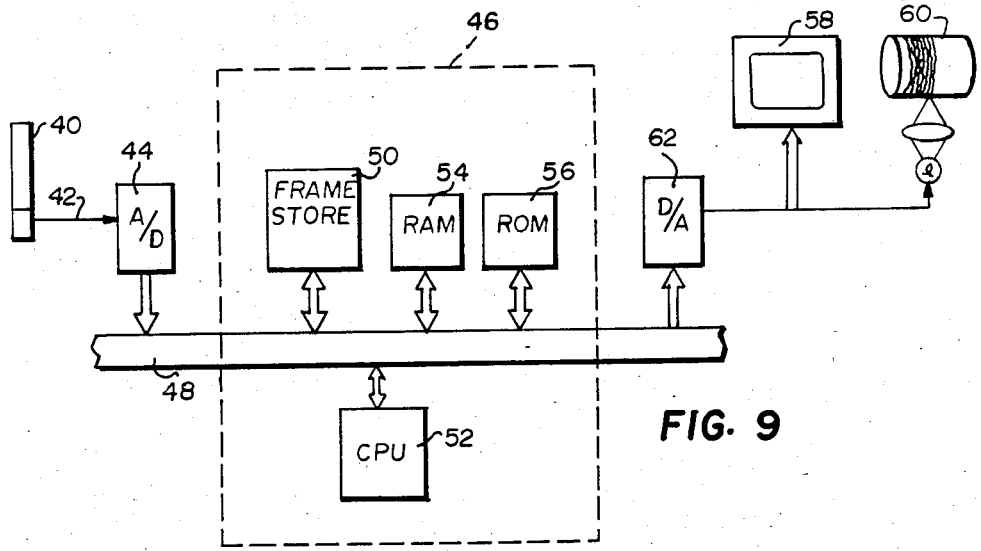
FIGS. 7a-b show patterns useful in describing the interpolation method for stripes.
FIGS. 8a-c show patterns useful in describing the interpolation method for corners.
FIG. 9 is a schematic diagram showing computer controlled apparatus for generating, processing and displaying a sampled image signal.

The invention will be illustrated with an example of a signal processing method for sampled image signals, where the image is intended for human viewing. The features that are presumed to be in the image are lines, sharp edges, and corners, features to which the human visual system is particularly sensitive.

As noted above, interpolating values between sampled values in a sampled image signal by using the mean value of the four nearest neighboring samples fails to preserve image features such as sharp edges or thin stripes when the image is reconstructed from the processed image signal. These reconstruction errors are particularly noticeable to the human observer, because they are features to which the human visual system is most sensitive. If, instead of the mean value of the four nearest neighbors, a median of the four nearest neighbors is used, the sharp edge and the thin line are reproduced as shown in FIGS. 4 and 5 respectively. The median M is defined here as the value halfway between the values of the two samples having middle values when the four samples are ranked $A \geq B \geq C \geq D$.

$$M = \frac{B+C}{2} \qquad (1)$$

As can be seen in FIG. 4, the median M is an appropriate interpolation routine for reconstructing the sharp edge, but as shown in FIG. 5, the stripe is still modulated with a pattern corresponding to the sampling pattern of the image sensor. A different interpolation routine is required to reconstruct the stripe.

Appropriate interpolation routines are determined by the image sampling pattern and the features that are presumed to exist in the image. The appropriateness of an interpolation routine may be assessed by processing a representative group of images with the interpolation routine and measuring the RMS reconstruction errors for the particular features being reconstructed.

However, before an appropriate interpolation routine is described for the stripe feature, means will be described for identifying the features in the local neighborhoods so that an appropriate interpolation routine can be applied.

To identify the local feature, the four nearest neighboring sampled values (above, below and both sides) of the interpolation location are classified as either greater than (H), or less than (L) the mean value (m) of the four neighboring sample values, where $$m = \sum_{i=1}^{4} N_i/4 \qquad (2)$$

where: $N_i$ are the neighboring sampled values.

There are three possible patterns, their rotations and mirror images. These patterns are called the EDGE, STRIPE, and the CORNER patterns. The EDGE is shown in FIGS. 6a and 6b, the STRIPE is shown in FIG. 6c, and the CORNER is shown in FIG. 6d. The X in the FIGS. 6a-d indicates the interpolation location. An appropriate interpolation routine for the EDGE pattern (the median) was described above. For the STRIPE pattern, there are two simple cases, a vertical stripe shown in FIG. 7a, and a horizontal stripe shown in FIG. 7b. These two cases are not distinguished using only the four nearest neighbors.

To distinguish the two cases, the eight next nearest neighbors are included in the interpolation routine and an appropriate interpolated value is the CLIP function:

$$X = \text{CLIP}_C^B(M - (S - M)) \quad (3)$$

where:
B and C are the middle ranked sample values of the four nearest neighbors as described above,
M is the median value as defined by equation (1),
S is the mean value of the eight next nearest neighboring samples, and $$\text{CLIP}_k^j(i) = j \text{ if } j \leq i$$
$$i \text{ if } k \leq i \leq j$$
$$k \text{ if } i \leq k.$$

Applying this interpolation routine to the samples of the stripe pattern shown in FIG. 3b, it is seen that the procedure properly reconstructs the original stripe pattern without reconstruction errors. To provide input data for the interpolation routine near the top and bottom of the portion of the image shown in FIG. 3b, it is assumed that the stripe pattern extends in the vertical direction.

Similarly, for the CORNER pattern, there are several possibilities that are not distinguished by the four nearest neighbors, i.e. a light corner on a dark background (FIG. 8a), a diagonal edge (FIG. 8b), and a dark corner on a light background (FIG. 8c). To distinguish these three cases, four more next nearest neighboring samples are used. The samples used are the ones that straddle the boundary between the light and dark members of the four nearest neighbors and are indicated by stars (*) in FIGS. 8a–c).

An appropriate interpolation routine that reconstructs the corner feature is the CLIP function:

$$X = \text{CLIP}_C^B (M-(S'-M))$$

where:
X is the interpolated value, $$\text{CLIP}_k^j(i)$$

is defined as above,
M is the median value of the four nearest neighboring samples, and
S' is the mean value of the four next nearest neighboring samples that straddle the light/dark boundary.

In 5–10% of the interpolation neighborhoods of the average photographic image, the classification as EDGE, STRIPE, or CORNER is ambiguous because neighboring sample values are either equal to each other or to the mean (m). Neighborhoods that could be either EDGE or CORNER, are preferably treated as EDGE, and neighborhoods where all the samples are equal are properly treated by the median interpolation routine. Accordingly, the following patterns, their rotations and mirror images are classified as EDGE.

```
  H   L       H     m         m     L
H L L   H H L H L m   m m L H
  H   L       m     m         m     m
```

Neighborhoods that could be either STRIPE or EDGE are better treated as STRIPE, and neighborhoods that could be classified as STRIPE or CORNER, are treated the same by either the STRIPE or the CORNER method. Accordingly, the following patterns, their mirror images and rotations are classified as STRIPE.

```
  H       H       L       H
L L L   L H   H L   m
  H       m       m       m
```

The only remaining pattern is the CORNER.

```
  H
L   H
  L
```

Referring now to FIG. 9, apparatus for generating, processing and displaying a sampled image signal is shown. An image sensor 40, such as a CCD frame transfer image sensor, having a checkerboard luminance sampling pattern like that shown in FIG. 1, produces a sampled analog signal on line 42. The sampled analog signal is converted to a digital signal by an analog-to-digital converter 44. The digital signal is supplied to a digital computer 46 on a data bus 48. The digital computer 46 performs the signal processing according to the present invention to interpolate luminance values between the luminance samples of the signal. The computer includes a frame store 50, for storing the unprocessed image signal and the processed image signal including the interpolated sample values, a central processing unit (CPU) 52, and random access and read only memories (RAM and ROM) 54 and 56 for storing the programs that control the computer 52. The frame store may comprise either a digital frame store comprising solid state memory elements, or a conventional memory device such as magnetic tape or disc storage. The processed digital signal is supplied to an output device such as a CRT 58 or a graphic arts scanner 60 via digital-to-analog converter 62.

Although the elements of the apparatus are shown physically connected by bus 48 in FIG. 9, the elements may be separated and the signals carried between the elements by storage media. For example, the sampled analog signal from the image sensor may be recorded directly on a magnetic tape recorder and later supplied to the computer for signal processing. Similarly, the processed sampled image signal may be recorded for later display.

Although the invention was reduced to practice using a general purpose digital computer, it will be apparent to one skilled in the art, that a programmed microprocessor, or custom designed integrated circuits can be used to practice the invention.

The signal processing function performed by the computer will now be described with reference to the block diagram of FIG. 10 and the flow charts of FIGS. 11–14.

Figure 10:
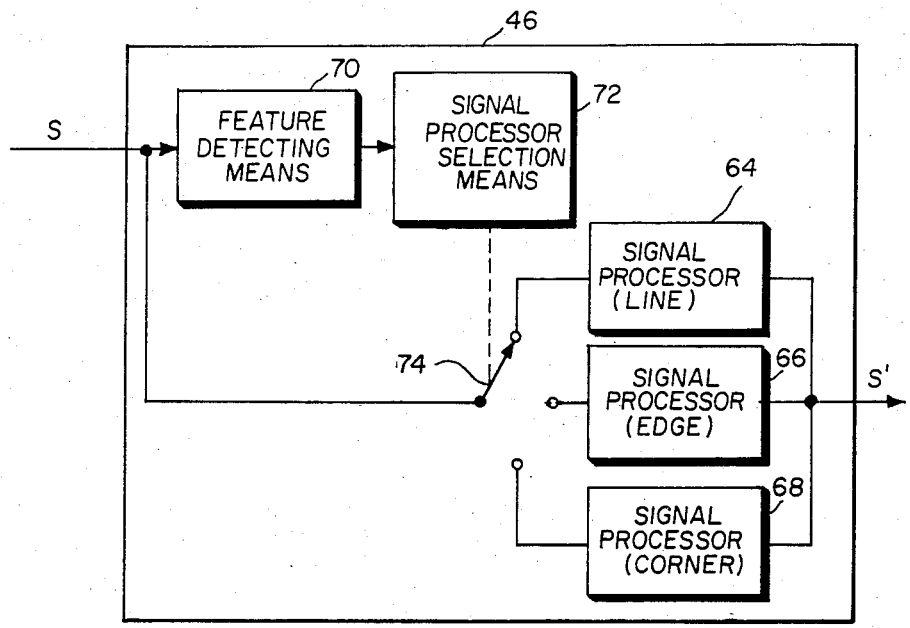
FIG. 10 is a block diagram useful in describing the functions performed by the digital computer.

Referring first to FIG. 10, the computer 46 is programmed to implement a plurality of signal processing means 64, 66 and 68 responsive to the sampled signal values in the image signal S for producing interpolated signal values S' appropriate for completing a line, edge or corner feature, respectively. A feature detecting means 70 is responsive to the sampled signal values in the sampled image signal S in the neighborhood of a interpolation location for detecting which of the geometric features is represented by the signal values, for producing a signal representative thereof. Signal processor selecting means 72 is responsive to the signal from the feature detecting means for selecting the appropriate signal processing means for producing the interpolated signal value. The appropriate signal processing means is selected, as indicated schematically by multiple position switch 74 controlled by signal processor selecting means 72, to produce the interpolated signal value S'.

Figure 11:
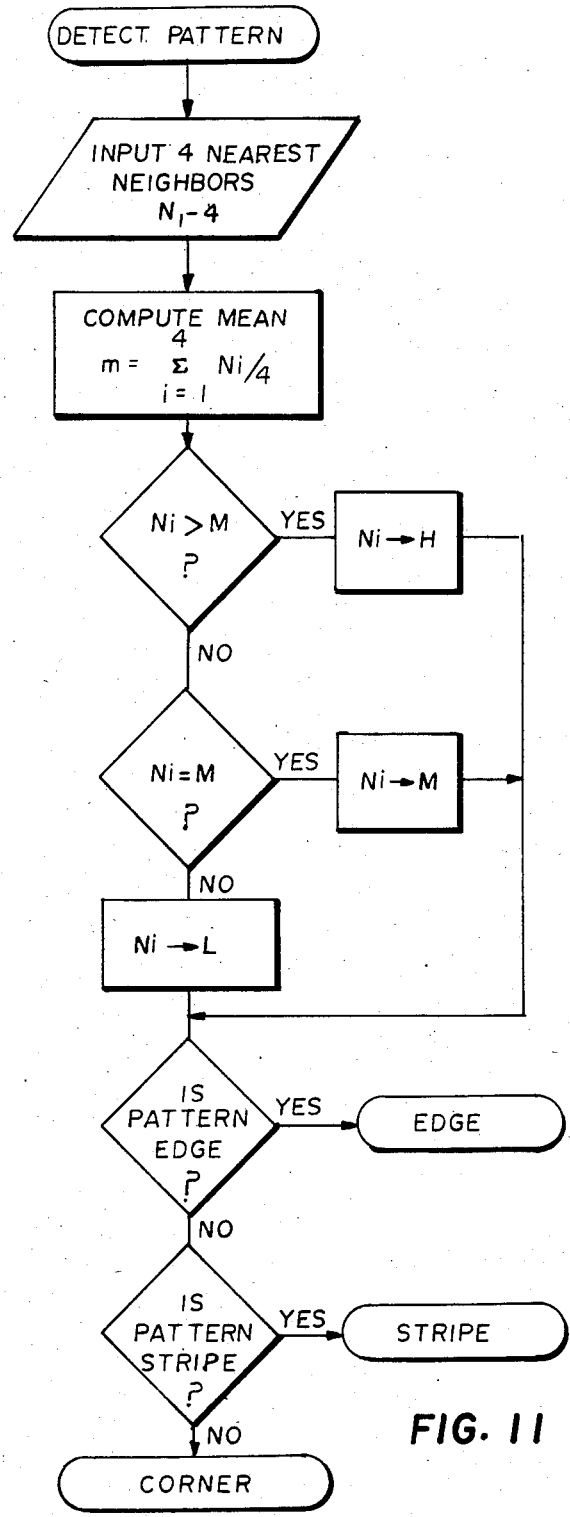
FIGS. 11-14 are flow charts useful in explaining the signal processing method according to the present invention.

Referring now to FIG. 11, the computer program will be described with reference to the flow charts. The computer 46 retrieves the luminance values of the four nearest neighboring samples surrounding the interpolation position from the frame store memory 50. The mean value (m) of the four nearest neighbors is calculated. Next, the value of each neighbor $N_i$ is compared with the mean value m to determine whether it is larger (H), smaller (L), or equal to (m) the mean. The resulting pattern of H's, L's and m's is checked to determine whether it is an EDGE pattern, a STRIPE patter or a CORNER pattern, by checking the pattern of H's, L's and m's with templates stored in the computer.

Figure 12:
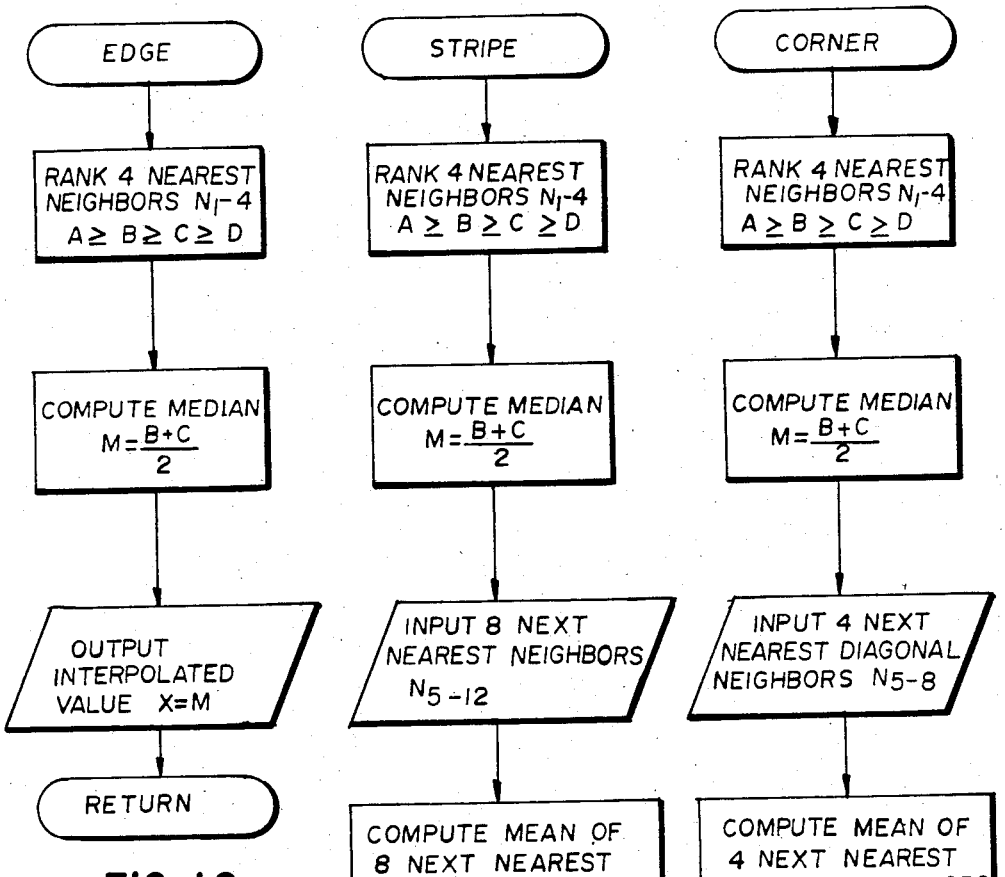

If the pattern is determined to be an EDGE, the interpolated value X is determined as shown in FIG. 12 by computing the median value M defined as the average of the two central valued samples in the four sample neighborhood.

Figures 13, 14:
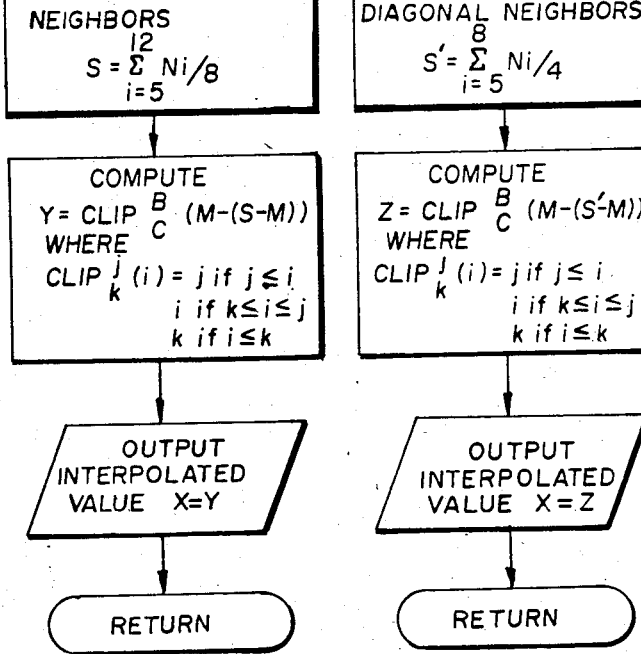

If the pattern is a STRIPE, the interpolated value X is determined as shown in FIG. 13. First the four neighboring samples are ranked and the median M is determined. The eight next nearest samples are retrieved from memory and the mean S of the eight next nearest samples is found. Then the CLIP function $$Y = CLIP_C^B(M - (S - M))$$

is used to define the interpolated value X=Y.

If the pattern is a CORNER, the interpolated value is found as shown in FIG. 14. First the median M of the four nearest neighbors is determined. The four next nearest neighbors that straddle the boundary between the light and dark members of the four nearest neighbors are retrieved from the frame store and their mean S' is found. M and S' are then used in the CLIP function.

$$Z = CLIP_C^B(M - (S' - M))$$

to determine the interpolated value X=Z. When the interpolated value is found, the value is stored in the frame store and the program returns to the beginning to compute the next interpolated value. The process is repeated until all the interpolated values between sample values in the sampled luminance signal have been provided. Alternatively, the computer calculates the interpolated values, combines the interpolated values with the sample values, and displays the processed signal real time.

The signal processing method was applied to sampled image signals generated by sampling several high resolution photographic images with a checkerboard sampling pattern. The apparent quality of the images reproduced from the processed signals was improved over the images reproduced from sampled image signals that were processed by using linear interpolation between the sample values. The appearance of geometrical detail in the geometrical features of the reproduced images using the signal processing method of the present invention was greatly improved. Careful scrutiny of the natural textures such as grass and foilage in the reproduced images revealed that the fine details of the natural textures had been rendered in a manner reminiscent of a cubist painting. However, these reconstruction errors were not readily noticeable to the human observer.

The invention as described is directed to interpolation of luminance signals. In practice, the sampled chrominance values are also interpolated, using methods known in the prior art to reconstruct a full color image.

Although the invention has been described with reference to a preferred embodiment wherein a human viewable image was sampled in a checkerboard pattern, the invention can be applied to other sampling patterns such as stripe patterns where the distances between the samples is different in two dimensions, and also for patterns where the distances between the samples occur irregularly in either one or both dimensions. The invention can also be used for machine viewable images, where the prior knowledge of the features in the images are determined by the machine environment.

Although the invention has been described as being embodied by signal processing apparatus having a full-frame store, it will be apparent to one skilled in the art that the apparatus need store only a few lines of the image signal at one time in order to perform the signal processing method.

ADVANTAGES AND INDUSTRIAL APPLICABILITY

The signal processing method has the advantage of reducing the reconstruction errors in an image reproduced from a sampled image signal. In one mode of the invention for processing human viewable images, the signal processing method has the further advantage of improving the appearance of a reproduced image by causing the reconstruction errors to occur principally in parts of the image (natural textures) where they are not noticeable to the human observer. The invention also has the advantage that when used to process a signal produced by an image sensor of a given size, an image can be produced having the same apparent image quality as the conventionally processed image reproduced from the signal from an image sensor having many more image sensing elements. The invention is useful in amateur or professional video and still imaging apparatus, in graphic arts apparatus for reproducing images from sampled image signals and in machine vision systems.

I claim:

1. A signal processing method for producing interpolated signal values between sampled signal values in a sampled image signal produced by a checkerboard sampling pattern characterized by:
  providing a plurality of different interpolation routines for producing interpolated signal values that complete a respective plurality of known geometrical image features, including edges, stripes and corners, the geometrical features being detected by the values of the four nearest neighboring samples such that the patterns:

$$\begin{array}{cccccccccccc}
& H & & & L & & H & & m & & m & & L \\
H & & L & L & & H & H & L & H & & L & m & m & L & & H \\
H & & & L & & & m & & m & & m & & m
\end{array}$$

their rotations and mirror images are detected as edges, the patterns;

$$\begin{array}{cccccccc}
& H & & & H & & L & & H \\
L & & L & L & & L & H & & H & L & & m \\
H & & & m & & & m & & m
\end{array}$$

their rotations and mirror images are detected as stripes, and the pattern $$\begin{array}{cc}
& H \\
L & H \\
L &
\end{array}$$

its rotations and mirror images are detected as a corner, where
- m is the mean value of the four nearest neighboring samples,
- H indicates a sample value greater than the mean,
- L indicates a sample value less than the mean; and the interpolation routine for edge features comprises producing the median value of the four nearest neighboring samples; the interpolation routine for the stripe feature comprises producing the value of the clip function $$X = \text{CLIP}_C^B (M-(S-M))$$

where:
- X is the interpolated value,
- $A \geq B \geq C \geq D$ are the values of the four nearest neighboring samples in rank order,
- M is the median value of the four nearest neighboring samples,
- S is the mean value of the eight next nearest neighboring samples; and $$\text{CLIP}_k^j (i) = j \text{ if } j \leq i$$
$$i \text{ if } k \leq i \leq j$$
$$k \text{ if } i \leq k;$$

the interpolation routine for corner features comprises producing the value of the clip function $$X = \text{CLIP}_C^B (M-(S'-M))$$

where:
- S' is the mean value of the four next nearest neighboring samples that straddle the boundary between the light and dark members of the four nearest neighboring samples;
- detecting which of the known geometrical image features is represented by a neighborhood of sample values; and
- applying the interpolation routine appropriate for completing the detected feature to the neighboring sample values to produce the interpolated signal value.

2. Signal processing apparatus for producing interpolated signal values between samples signal values in a sampled image signal produced by a checkboard sampling pattern, comprising:
   a plurality of signal processing means responsive to sampled signal values in the neighborhood of an interplation location for producing interpolated signal values appropriate for completing a respective plurality of known geometrical features, including edges, stripes, and corners, the detecting means being responsive to the four nearest neighboring sample values to produce a signal representing the patterns:

$$\begin{array}{cccccccccccc}
& H & & & L & & H & & m & & m & & L \\
H & & L & L & & H & H & L & H & & L & m & m & L & & H \\
H & & & L & & & m & & m & & m & & m
\end{array}$$

their rotations and reflections as edges, the patterns;

$$\begin{array}{cccccccc}
& H & & & H & & L & & H \\
L & & L & L & & L & H & & H & L & & m \\
H & & & m & & & m & & m
\end{array}$$

their rotations and reflections as stripes, and the pattern $$\begin{array}{cc}
& H \\
L & H \\
L &
\end{array}$$

its rotations and reflections as a corner, where:
- m is the mean value of the four nearest neighboring samples,
- H indicates a sample value greater than the mean, and
- L indicates a sample value less than the mean; and the signal processing means include means for producing a signal representing the median value of the four nearest neighboring samples for the edge feature; mean for producing a signal representing the value of the clip function for the stripe feature $$X = \text{CLIP}_C^B (M-(S-M))$$

where:
- X is the interpolated value,
- $A \geq B \geq C \geq D$ are the values of the four nearest neighboring samples in rank order,
- M is the median value of the four nearest neighboring samples,
- S is the mean value of the eight next nearest neighboring samples; and $$\text{CLIP}_k^j(i) = j \text{ if } j \leq i$$
$$i \text{ if } k \leq i \leq j$$
$$k \text{ if } i \leq k; \text{ and}$$

means for producing a signal representing the value of the clip function for the corner $$X = \text{CLIP}_C^B (M-(S'-M))$$

where:
- S' is the mean value of the four next nearest neighboring samples that straddle the boundary between the light and dark members of the four nearest neighboring sample values;

feature detecting means, responsive to sampled signal values in the neighborhood of an interpolation location for detecting which of the plurality of known geometrical features is represented by the sample values in the neighborhood and producing a signal representative thereof; and signal processor selection means responsive to the signal produced by the feature detecting means for selecting an appropriate one of the plurality of signal processing means for producing the interpolated signal value.

* * * * *